United States Patent [19]
Folsom et al.

[11] Patent Number: 5,168,417
[45] Date of Patent: Dec. 1, 1992

[54] ISOLATED SOLID STATE RELAY

[75] Inventors: Thomas L. Folsom, Hillsboro; James D. Christensen, Portland, both of Oreg.

[73] Assignee: Electronics Diversified, Inc., Hillsboro, Oreg.

[21] Appl. No.: 657,070

[22] Filed: Feb. 19, 1991

[51] Int. Cl.$^5$ .............................................. H02H 3/24
[52] U.S. Cl. ..................................... 361/118; 361/56; 361/111
[58] Field of Search ................... 361/79, 56, 104, 117, 361/119, 111, 91, 118; 307/202, 254

[56] References Cited
U.S. PATENT DOCUMENTS 3,678,291  7/1972  Coe ..................................... 307/202
4,979,071  12/1990  Ito et al. .................................. 361/56

*Primary Examiner*—A. D. Pellinen
*Assistant Examiner*—S. Jackson
*Attorney, Agent, or Firm*—Robert L. Harrington

[57] ABSTRACT

A solid state relay includes a protective input stage at its control terminals to isolate the control circuit from line voltage or line current in the event of relay failure. The protective circuit includes a series combination of a voltage responsive element and a current responsive element. The current responsive element connects to the input or control terminal of the solid state relay and the voltage responsive element connects to ground. The interconnection of the current responsive element and voltage responsive element serves as the device input terminal for connection to a control circuit. In the event of relay failure, the voltage responsive element reacts to the increased voltage by providing conductivity, by way of the current responsive element, between the solid state relay input terminal and ground. The increased current flow opens the current responsive element and thereby protects the control circuit against the possibility of damage caused by current flow originating from the relay line voltage terminals.

10 Claims, 1 Drawing Sheet

ISOLATED SOLID STATE RELAY

FIELD OF THE INVENTION

The present invention relates to relay devices and particularly to solid state relay devices with isolation against component damaging currents

BACKGROUND OF THE INVENTION

Traditional mechanical relay devices receive a control signal at a coil element and the coil element responds by producing a magnetic field for bringing together contact elements of the relay. The contact elements connect to nodes of a controlled circuit. A control circuit driving the coil element thereby determines conductivity, i.e., performs a switching function, between nodes of the controlled circuit. Such mechanical relays have suffered from relatively slow switching times and the need for a relatively large coil drive current to accomplish switching. Solid state relays address these concerns by providing high speed switching with relatively low drive current requirements. Accordingly, solid state relays are now a preferred form of control in many control applications.

An important function of any relay is isolation between the control circuit and the controlled circuit. The relay provides a switching function between nodes of the controlled circuit, but no electrical connection exists between the control circuit and the controlled circuit. Thus, the control circuit may be a low power digital logic circuit with the relay device acting as a control interface to a much higher power circuit. For example, the control circuit could be a computer-based lighting control panel and the controlled circuit a high powered theater lighting system. A set of solid state relays interconnecting the control panel and the lighting system provide programmed control of the theater lighting system. An important aspect of the relationship between the control panel, operating at relatively low voltage and our rent levels, and the lighting system, operating at much higher voltages, is the electrical isolation provided by the solid state relays. If the high voltages or currents in the lighting system were introduced into the control panel, extensive damage to the control panel is likely.

When a solid state relay receives excess currents, i.e., beyond specified ratings such as in a dead short situation, internal failures of the solid state relay can cause a short between the line voltage terminals, i.e., those connected to high voltage high current devices, and the input control terminals, i.e., those connected to low voltage low current devices. If this happens the line voltage can feed into the normally isolated control terminals to reach and destroy the control circuit.

SUMMARY OF THE INVENTION

In accordance with the present invention, the voltage between each input control terminal and ground is monitored and when this voltage exceeds a given voltage, conductivity between the control terminal and ground is established. The conductivity path includes a fusible link element which opens in response the abnormal current flow, thereby breaking the electrical connection between the control terminals and the control circuit. Accordingly, the control circuit is protected, in the event of relay failure, against damaging current flow originating from the line voltage terminals.

According to a preferred embodiment of the present invention, a solid state relay including control terminals and line voltage terminals includes, for each control terminal, a series combination of a voltage responsive conductor and a fusible link. The fusible link connects to the control terminal of the relay and the voltage responsive conductor connects to the base of the solid state relay, or to earth ground. The interconnection of each fusible link and voltage responsive conductor is then available as a relay input terminal, i.e., in place of the corresponding control terminal of the solid state relay. Should the solid state relay fail and a large voltage develop at a control terminal, the associated voltage controlled conductor quickly establishes a conduction path to ground whereby sufficient current flows in the fusible link to blow the link and isolate the control circuit from damaging current.

DETAILED DESCRIPTION

Figure 1:
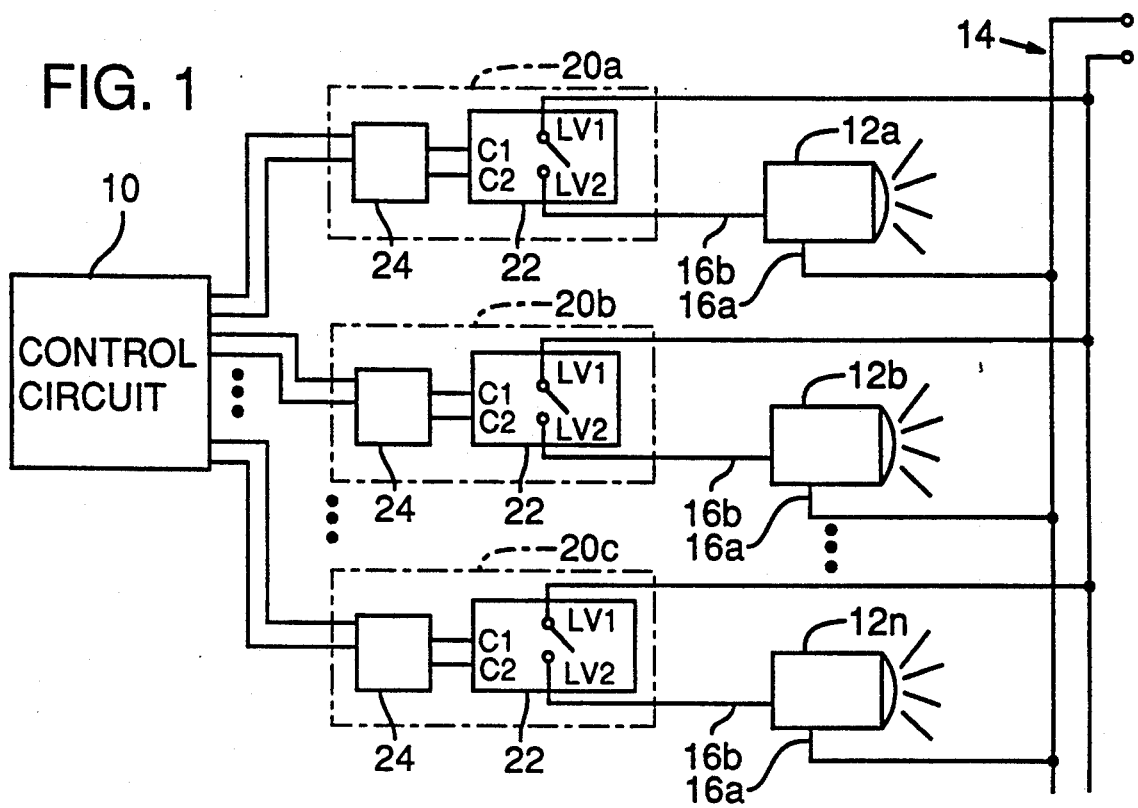
FIG. 1 illustrates a computer based theater lighting control device and a theater lighting system interconnected by isolated solid state relay devices in accordance with the present invention.

FIG. 1 illustrates schematically the context in which an isolated solid state relay in accordance with the present invention is utilized. The illustrated application of the present invention is a theater lighting control system, but it will be appreciated that the present invention finds application in a wide variety of control environments. In FIG. 1, a theater lighting system includes a control circuit 10 which may be a computer based programmable device having numerous operator controls (not shown) and programmable lighting sequences. Control circuit 10 selectively operates ones of a plurality of theater lights 12, individually numbered 12a-12n in FIG. 1. Each theater light 12a receives power from a line voltage bus 14 comprising two electrical conductors 14a (power) and 14b (ground or neutral). The power terminals 16a and 16b of each light 12 are applied to respective ones of conductors 14a and 14b of line voltage bus 14. Each power terminal 16a is coupled directly to the conductor 14a of line voltage bus 14. Accordingly, it may be appreciated that selective independent coupling of the other power terminals 16b of each light 12 to the conductor 14b of line voltage bus 14 provides selective actuation of each light 12.

Selective coupling of conductor 14b of line voltage bus 14 to ones of the power terminals 16b is accomplished by isolated solid state relays 20a-20n. For example, the isolated solid state relay device 20a operates the theater light 12a by selective coupling of the power terminal 16b of light 12a to the conductor 14b of line voltage bus 14. Each isolated solid state relay device 20 is coupled to control circuit 10 for independent operation thereof. In this manner, by virtue of the intermediate isolated solid state relay devices 20, independent control over each of theater lights 12a-12n is available. Each solid state relay device 20 comprises a conventional solid state relay 22 and an input stage protector circuit 24. In accordance with conventional solid state relay operation, each solid state relay 22 includes a pair of control input terminals, individually numbered C1 and C2, and a pair of line voltage terminals, individually numbered LV1 and LV2. Application of a control signal voltage across terminals C1 and C2, e.g., on the order of 0 to ten volts, results in selective conductivity between line voltage terminals LV1 and LV2, operating at AC voltages on the order of 120 to 240 volts. Thus, delivering a control voltage signal to terminals C1 and C2 selectively actuates the corresponding theater light 12.

Conventional solid state relays 22 are, when exposed to excess current, subject to failure resulting in the possibility of a conductive path between the line voltage terminals and the control terminals. Heretofore, such failure potentially resulted in a conductive path between the control circuit, typically coupled directly to control terminals C1 and C2, and the line voltage bus 14. Such conductivity path, in most cases, results in severe damage to the control circuit 10. The present invention addresses the potential for such failure of the control circuit by provision of the input stage protective circuit 24 intermediate of the solid state relay 22 and the control circuit 10.

Figure 2:
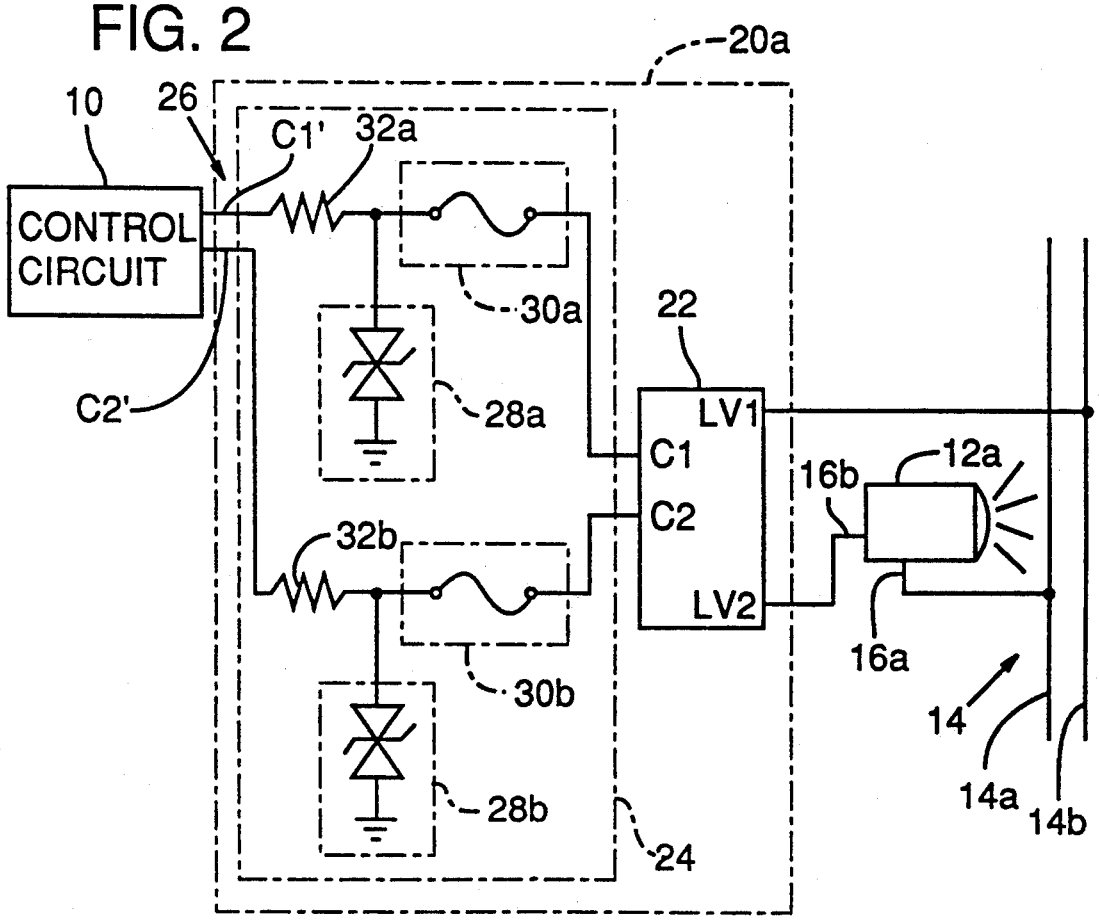
FIG. 2 details a solid state relay device of FIG. 1 and an input stage isolation circuit in accordance with the present invention.

FIG. 2 illustrates details of the isolated solid state relay 20a and represents the other isolated solid state relays 20b-20n. In FIG. 2, the isolated solid state relay 20a includes the above-described solid state relay 22 coupled to theater light 12a. More particularly, line voltage terminal LV1 of relay 22 couples to conductor 14b of line voltage bus 14 and line voltage terminal LV2 couples, by way of theater light 12a to conductor 14a of line voltage bus 14. Input stage protector circuit 24 receives a control signal 26 from control circuit 10 and delivers the control signal to control terminals C1 and C2 of solid state relay 22. Under normal operating conditions, the control signal 26 received from control circuit 10 arrives unchanged at solid state relay 22. In the event of failure of solid state relay 22, however, input stage protector circuit 24 isolates control circuit 10 from solid state relay 22 in order to avoid damage to control circuit 10.

Input stage protector circuit 24 comprises a voltage responsive element 28 and a current responsive element 30 for each of control terminals C1 and C2. Accordingly, a first voltage responsive element 28a and first current responsive element 30a are connected in series with the current responsive element 30a connected to control terminal C1 of relay 22 and the voltage responsive element 28a connected to a ground reference. A similar series combination of a second voltage responsive element 28b and a second current responsive element 30b are similarly coupled to control input C2 of relay 22. The interconnection of voltage responsive element 28a and current responsive element 30a forms a relay 20a input terminal C1'. Similarly, the interconnection of voltage responsive element 28b and current responsive element 30b forms a relay 20 control terminal C2'. Optional resistors 32a and 32b may be serially interposed between the interconnection of corresponding elements 28 and 30 and the control terminals C1' and C2', respectively. Resistors 32 and 34 are used to prevent excess current flow from control circuit 10 for the case of a voltage spike at terminals C1' and C2' temporarily shorting element 28. Thus, the input stage protective circuit 24 replaces the control terminals C1 and C2 of relay 22 with control terminals C1' and C2'. Control circuit 10 delivers to control terminal C1' and C2' the control signal 26 as it would for the solid state relay 22.

Each series combination of voltage responsive element 28 and current responsive element 30 operates in a similar manner as follows. With respect to control terminal C1 of solid state relay 22, in the event of failure of solid state relay 22, a large voltage may develop at the control terminal C1 corresponding, potentially, to the voltage present on line voltage bus 14. Such excess voltage present at control terminal C1 appears across voltage responsive element 28a. In response to this increased voltage across voltage responsive element 28, element 28 provides a conductive path from control terminal C1 to ground by way of current responsive element 30a. In response to this large current passing through current responsive element 30a, current responsive element 30a opens the conductive path between control terminal C1 and control terminal C1' thereby isolating control circuit 10 from line voltage bus 14. In some cases, internal components of relay 22 may fail, before element 30a opens, due to the ground connection provided by element 28a. In either case, isolation from bus 14 is achieved. Accordingly, should excess voltage develop at either of control terminals C1 or C2, the input stage protector circuit 24 prevents damage to control circuit 10.

In the illustrated embodiment of FIG. 2, the voltage responsive element 28a is a PN silicon transient voltage suppressor sold under the trade name Transzorb and is available from General Semi-Conductor Industries. In the preferred embodiment, the voltage responsive element 28a is a bi-directional element responding to excess voltages of either polarity. The current responsive element 30 is a fusible link.. Such fusible link may be provided by a conventional fuse or, preferably, a thin printed circuit board trace or integrated circuit trace adapted to open in response to a given threshold current. The Transzorb device was selected for its high speed reaction time to excess voltage. In selecting a threshold voltage for element 28, it need be greater than the normal operating voltages of the control signal 26. Thus, an acceptable threshold voltage for element 28 would be on the order of 20 volts for a control signal 26 operating at 0 to 10 volts.

It may be appreciated that the faster the response time of the voltage responsive element 28, the less possibility of damage to circuit 10 in the event of relay 22 failure. Other devices which may be used as voltage responsive element 28 include metal oxide varistors, zener diodes, neon lamps, spark gaps, or any other device which has a high resistance until a specific voltage is created across the device. Again, because speed is critical in the operation of input stage protector circuit 24, the Transzorb device is the preferred embodiment of voltage responsive element 28.

Thus, an isolated solid state relay device has been shown and described. The isolated solid state relay device includes a conventional solid state relay device coupled in conventional manner to a line voltage bus and a controlled device, e.g., a theater light. In accordance with the present invention, an input stage protector device is provided at the control terminals of the solid state relay as an interface between a control circuit and the solid state relay. Should the solid state relay device fail and thereby provide a conductive path between the control terminals of the solid stage relay and the line voltage bus, the input state protective circuit 24 prevents excess current flow and/or voltage from reaching the control circuit. It may be appreciated that isolation of the control circuit is in effect accomplished by the voltage responsive element 28 providing a direct path to ground whereby little or voltage or current originating from the line voltage bus 14 may reach the control device 10. However, the current responsive element 30a is desirable as it prevents continued excess current flow into the ground connection provided by voltage responsive element 28.

It may be appreciated that the present invention may be incorporated into pre-existing solid state relays by provision of a small circuit board mounted thereto and including the voltage responsive element 28 and current responsive element 30 as described above. Alternatively, the input stage protector circuit 24 may be incorporated integrally into the solid state relay at manufacture.

We claim:

1. A relay comprising first and second control terminals and at least two line voltage terminals adapted for selectively establishing conductivity between said line voltage terminals in response to a control signal presented across said first and second control terminals, said relay comprising:
   a solid state relay including said line voltage terminals and first and second relay input terminals for determining conductivity between said line voltage terminals in response to said control signal presented thereat;
   a first voltage responsive element having first and second terminals and providing conductivity therebetween in response to voltage thereacross exceeding a given threshold voltage, said first terminal of said first voltage responsive element being coupled to a ground terminal of said relay;
   a first current responsive element having first and second terminals and providing conductivity therebetween in response to current flow therebetween below a given threshold current, said first terminal of said first current responsive element being coupled to said first relay input terminal, said second terminal of said first current responsive element and the second terminal of said first voltage responsive element being interconnected and forming said first control terminal of said relay;
   a second voltage responsive element having first and second terminals and providing conductivity therebetween in response to voltage thereacross exceeding a given threshold voltage, said first terminal of said second voltage responsive element being coupled to said ground terminal of said relay; and
   a second current responsive element having first and second terminals and providing conductivity therebetween in response to current flow therebetween below a given threshold current, said first terminal of said second current responsive element being coupled to said second relay input terminal, said second terminal of said second current responsive element and the second terminal of said second voltage responsive element being interconnected and forming said second control terminal of said relay whereby said control signal presented across said first and second control terminals is delivered directly to said first and second relay input terminals under condition that said first and second voltage responsive elements carry voltage potential below said given threshold voltage and said first and second current responsive elements carry current below said given threshold current.

2. A relay according to claim 1 wherein at least one of said first and second voltage responsive elements is a PN transient voltage suppressor.

3. A relay according to claim 1 wherein said solid state relay is adapted to selectively establish conductivity between said line voltage terminals in response to an input voltage of said control signal across said first and second input terminals, a normal operating voltage range for said input voltage being less than said given threshold voltage.

4. A relay according to claim 1 wherein at least one of said first and second current responsive elements comprises a fusible link whereby conductivity between said first and second terminals of said at least one current responsive element is lost in response to current therethrough exceeding said threshold current.

5. A protector circuit for a solid state relay having two input control terminals and two line voltage terminals whereby a control signal applied across said two input control terminals determines conductivity between said line voltage terminals, said protector circuit providing for each of said input control terminals an associated circuit comprising:
   a voltage responsive element adapted to shunt current from the associated input control terminal to a relay ground terminal in response to voltage present at the associated input control terminal exceeding a given threshold voltage; and
   a current responsive element normally coupling conductively said voltage responsive element and the associated input control terminal and operative to electrically decouple said voltage responsive element and the associated input control terminal in response to said voltage responsive element shunting current from said input control terminal, whereby said protector circuit may receive said control signal at each of said voltage responsive elements to apply said control signal to the associated input control terminals by way of the associated current responsive elements and upon decoupling by said current responsive elements said control circuit is electrically decoupled from said solid state relay.

6. A protector circuit according to claim 5 wherein said solid state relay selectively provided conductivity between said line voltage terminals in response to the control signal having normal operating maximum voltage across said input terminals below said given threshold voltage.

7. A protector circuit according to claim 5 wherein at least one of said current responsive elements is a fusible link adapted to open in response to current therethrough exceeding a given threshold current.

8. A protector circuit according to claim 5 wherein at least one of said voltage responsive elements is a PN transient voltage suppressor.

9. A control interface for protecting a control circuit against damage from voltages or currents of a controlled circuit, said control interface comprising:
   a solid state relay having line voltage terminals coupled to corresponding nodes of said controlled circuit for selective conductive coupling of said nodes, said relay having first and second input terminals receiving a control signal of said control circuit normally operating in a given voltage range for determining conductivity between said line voltage terminals, there being under normal operating conditions no conductivity between said line voltage terminals and said input terminal, said solid state relay being subject to failure outside normal operating conditions wherein upon such failure conductivity between said line voltage terminals and said input terminal is possible;

a first voltage responsive element coupled to said first input terminal and operative to shunt current from said first input terminal to a relay ground terminal in response to a voltage thereat exceeding said given voltage range;

a first current responsive element lying along a first conductive path including at least one of said line voltage terminals and said first input terminal, the first conductive path being established by said failure of said relay, said first current responsive element being operative to open said first conductive path in response to said first voltage responsive element shunting current to said relay ground terminal;

a second voltage responsive element coupled to said second input terminal and operative to shunt current from said second input terminal to said relay ground terminal in response to a voltage thereat exceeding said given voltage range; and a second current responsive element lying along a second conductive path including at least one of said line voltage terminals and said second input terminal, the second conductive path being established by said failure of said relay, said second current responsive elements being operative to open said conductive path in response to said second voltage responsive element shunting current to said relay ground terminal.

10. A control interface according to claim 9 wherein each of said current responsive elements normally conductively couples the associated voltage responsive element and associated input terminal whereby upon shunting of current from the associated input terminal said shunted current passes through the associated current responsive element.

* * * * *